(12) United States Patent
Allen

(10) Patent No.: US 10,491,650 B1
(45) Date of Patent: Nov. 26, 2019

(54) MONITORING PERFORMANCE OF COMPUTING DEVICES

(75) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 622 days.

(21) Appl. No.: 13/367,083

(22) Filed: Feb. 6, 2012

(51) Int. Cl.
*H04L 12/26* (2006.01)
*H04L 29/06* (2006.01)
*G06Q 30/02* (2012.01)
*G06Q 50/00* (2012.01)

(52) U.S. Cl.
CPC ......... *H04L 65/80* (2013.01); *G06Q 30/0201* (2013.01); *G06Q 50/01* (2013.01)

(58) Field of Classification Search
CPC ...................................................... H04L 43/04
USPC ............................................................ 709/224
See application file for complete search history.

(56) References Cited

U.S. PATENT DOCUMENTS

| | | | |
|---|---|---|---|
| 7,865,888 B1 | 1/2011 | Qureshi et al. | |
| 8,006,235 B2 | 8/2011 | Broman et al. | |
| 8,220,054 B1 * | 7/2012 | Lu | 709/224 |
| 8,521,893 B2 * | 8/2013 | Park et al. | 709/230 |
| 8,938,533 B1 * | 1/2015 | Bansal | H04L 43/022 709/224 |
| 2008/0320124 A1 * | 12/2008 | Lee | G06F 17/3089 709/224 |
| 2011/0218770 A1 * | 9/2011 | Ii | G06F 11/30 702/182 |
| 2011/0275940 A1 * | 11/2011 | Nims et al. | 600/483 |
| 2012/0071216 A1 * | 3/2012 | Salsbery | G06F 1/3203 455/574 |

* cited by examiner

*Primary Examiner* — Michael Won
*Assistant Examiner* — Sibte H Bukhari
(74) *Attorney, Agent, or Firm* — Knobbe, Martens, Olson & Bear, LLP

(57) ABSTRACT

Systems and methods for monitoring the performance of one or more computing devices are provided. A performance information collection system may transmit a performance monitoring agent and a number of profilers to a client computing device. Each profiler may also be associated with different processing requirements of the computing device, and may measure different performance metrics or similar performance metrics at different rates. The performance monitoring agent and a profiler may collect performance metrics of a program executing on the client computing device. If the performance information collection system determines that additional performance information should be collected, the performance monitoring agent may execute one or more alternate profilers to collect additional performance metrics.

20 Claims, 5 Drawing Sheets

MONITORING PERFORMANCE OF COMPUTING DEVICES

BACKGROUND

Generally described, computing programs executed by a computing device may require specific resources of the computing device in order to properly function. Program requirements may include access to a central processing unit (CPU) with at least a given processing power, access to random access memory (RAM) of a given speed or capacity, access to non-volatile memory of a given speed or capacity, or access to additional or alternative system resources. Because in most computing devices access to one or more of these system resources is at least somewhat limited, computer programs may be designed to utilize available resources as efficiently as possible. However, in some instances, computer programs may utilize system resources in a manner not intended by the developer of the program, or may otherwise contain errors, mistakes, failures, or faults, generally referred to as imperfections. These imperfections may result in adverse effects, such as decreased performance of the computing devices and program or system crashes.

In order to develop software which uses system resources efficiently and contains a reduced number of imperfections, developers may analyze a program during execution to determine the programs performance. This information may then be used to further modify the computer program. In some instances, analysis of a program may occur in a development or testing environment. In these environments, degradation of performance of a program may be acceptable as a result of conducting analysis. However, in other instances, analysis of a program may occur in a production environment. In these environments, degradation of performance due to analysis techniques may be seen as an undesirable but necessary effect in order to reduce software imperfections.

Further, collections of computing devices may communicate information via communication networks or a series of communication networks. In some instances, computing programs, such as those described above, or information regarding those programs, may be transferred over such communication networks.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
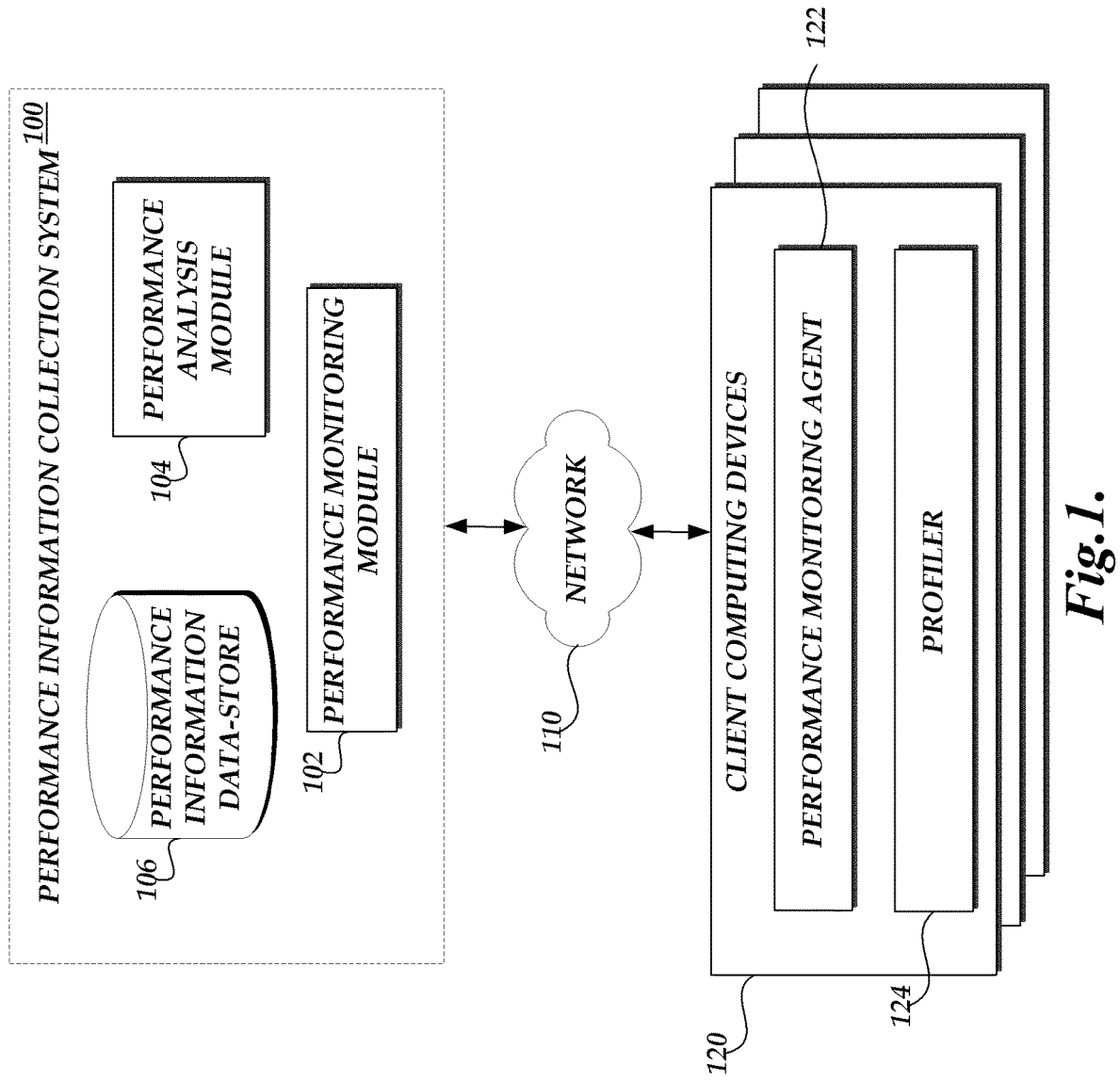
FIG. 1 is a block diagram illustrating an embodiment of a performance information collection system and one or more client computing devices.

Generally described, aspects of the present disclosure relate to collecting performance information related to computing programs executed by computing devices. Specifically, systems and methods are disclosed which facilitate transmission of performance information regarding a monitored program ("target program") from a client computing device to a performance information collection system. A client computer device may include a performance monitoring agent as well as a number of profilers. Generally described, a profiler may correspond to a program configured to monitor the performance of computing devices or programs executed by a computing device. Each profiler, in conjunction with the performance monitoring agent, may monitor the performance of a target program according to various performance metrics. Examples of performance metrics include, but are not limited to, occurrences of specified failures (e.g., crashes, errors, etc.), use of computing resources (e.g., CPU, RAM, or HDD use), frequency or amount of use of specific computing instructions, frequency or duration of function calls, amount or frequency of lost information (e.g., transmission failures or memory faults), and latency of a program or operations.

Illustratively, the performance information collection system can generate and maintain a set of profilers for collecting performance metrics. Each profiler in the set of profilers may be associated with monitoring a different set of performance metrics, or may monitor the same or similar performance metrics at a different rate. For example, a first profiler may be associated with monitoring performance metrics at a relatively low rate, such that a relatively low amount of information may be collected. A second profiler may be associated with monitoring performance metrics at a relatively high rate, such that a larger amount of performance information may be collected. Further, each profiler may require different computing resources of a client computing device in order to execute. As such, various profilers may have different levels of impact of the client experience of the client computing device.

In order to monitor the performance of a target program, a performance information collection system may transmit the above referenced profilers to a client computer device, as well as the performance monitoring agent (if it does not already exist within the client computing device). Initially, the performance monitoring agent may utilize a profiler associated with a minimal impact on client experience (e.g., with minimal required computing resources) in order to monitor a target program. After performance information is collected, the performance monitoring agent may transmit the information to the performance information collection system.

The performance information collection system may include a performance analysis module that inspects the collected performance information. Illustratively, the performance analysis module attempts to detect anomalous performance data, identify specific behaviors or otherwise relevant performance data. In some situations, more information regarding the performance of the target program may be needed or desired. As such, the performance information collection system may provide one or more client computing devices with a second profiler. Such a second profiler may monitor different performance metrics than the initially engaged profiler. Additionally or alternatively, a second profiler may monitor the same performance metrics at different rates. In some embodiments, the second profiler may collect more thorough performance information when compared to the first profiler. In addition, the second profiler may require a higher level of computing resources of the client computing device. As such, the second profiler may be associated with a higher impact on the experience of the client.

Illustratively, the second profiler, as well as additional subsequent profilers, may be engaged on one or more client computing devices. For example, in some embodiments, a second profiler may be engaged on the client computing device on which the anomalous performance was detected. In other embodiments, a second profiler may be engaged on computing devices similar to the client computing device on which the anomalous performance was detected. In still more embodiments, a second profiler may be engaged on any computing devices where potentially useful performance information may be collected.

After receiving instructions to engage a second profiler, a performance monitoring agent on a client computing device may halt execution of the initial profiler, and instantiate the second profiler. In some embodiments, halting execution of an initial profiler may require modification of computer code corresponding to the target program. Similarly, in some embodiments, instantiation of a second profiler may require modification of computer code corresponding to the target program. Similar to the initial profiler, the second profiler may then collect information regarding the performance of a target program executing on the client computing device. This information may then be transmitted back to the performance information collection system.

Illustratively, a performance information collection system as described above may be used in conjunction with a target program in order to correct errors, failures, or flaws within the target program. For example, in some situations, an error may occur relatively rarely within a target program, and may not be encountered in a development or test environment. Further, in order to correct such an error, detailed information may be needed. However, it may not be desirable to constantly collect such detailed information from all clients, due to the necessary computing requirements and potential impact on the experience of the client. Further, though clients may notice a flaw or failure within a target program, they might not report the failure to a developer of the target program. By use of a performance information collection system as will be described below, a performance monitoring agent, in conjunction with a profiler, may detect potential failures within a target program while having a minimal or negligible impact on the experience of a client. Further, the performance monitoring agent may, with the consent of the client, transmit information corresponding to the potential failure to a performance information collection system. Where additional information is needed to correct a potential failure, the performance information collection system and performance monitoring agent may provide additional profilers in order to collect additional information. As such, performance information can be aggressively monitored only in situations where aggressive monitoring is necessary.

Because use of embodiments of the present disclosure may have minimal or negligible impact on the majority of client computing devices, systems and methods disclosed herein may be implemented on a larger number of client computing devices than may otherwise be possible. Further, though reference may be made throughout this disclosure to input or feedback from a client or user of a client computing device, the current disclosure should not be limited to environments including end users or clients. For example, the systems and methods disclosed herein may be applied to computing devices which generally have no direct user, such as server computing devices or computing devices within data processing centers.

Though the above description generally refers to two profilers, the performance information collection system as described herein may be associated with any number of profilers monitoring a number of performance metrics at a variety of rates. For example, profilers associated with progressively more aggressive information collection may be iteratively executed until a desired level of performance information has been gathered. As a further example, profilers associated with various performance metrics may be executed based on the likelihood that they will gain required performance information, such that the minimum amount of performance information necessary is collected.

In some embodiments, a set of profilers may include a hierarchy of profilers divided into multiple branches. For example, each branch within such a hierarchy may correspond to a set of profilers directed to monitoring a specified set of performance metrics. Illustratively, a first or root profiler may be a profiler configured to monitor a wide variety of performance metrics at a very low rate in order to minimize impact on performance of a target program. Where anomalous performance information is detected, a branch of the profiler hierarchy may be selected based on the anomalous performance information. Illustratively, a profiler or profiler branch may be directed to situations in which anomalous CPU usage is detected. Thereafter, each additional profiler or profiler branch may be associated with a more specific set of anomalous performance information (e.g., one branch may be directed to continuously high CPU usage, another may be directed to intermittently high CPU usage). In this illustrative embodiment, a profiler may be selected based on the profiler hierarchy, the previously executed profiler, and the anomalous information contained within collected performance information.

Specific embodiments and example applications of the present disclosure will now be described with reference to the drawings. These embodiments and example applications are intended to illustrate, and not limit, the present disclosure.

FIG. 1 is a block diagram illustrating an embodiment of a performance information collection system 100 including a performance monitoring module 102, a performance analysis module 104, and a performance information datastore 106. In this illustrative embodiment, the performance information collection system 100 is in communication with a number of client computing devices 120 via a network 110.

Each client computing device includes a performance monitoring agent 122 as well as a profiler 124. In some embodiments, each of the performance monitoring agent 122 and the profiler 124 may be transmitted to a client computing device 120 from the performance information collection system 100. In other embodiments, the client computing device 120 may receive either or both of the performance monitoring agent 122 and the profiler 124 from another source. Though this illustrative embodiment is described with respect to a single profiler 124, as will be described in more detail below, embodiments of the present disclosure may include any number of profilers of various configurations. Further, though a number of profilers may be available to the performance information collection system 100, the number of profilers stored on a client computing device 120 at any given point may be limited. For example, the performance information collection system 100 may further include a profiler data-store (not shown) including all available profilers. Each profiler (such as profiler 124) may be transferred to each client computing device 120 in conjunction with a command to execute the profiler. Illustratively, this may result in each client computing device 120 storing only the specific profiler needed to execute received commands from the performance information collection system 100. In other embodiments, a client computing device 120 may include a number of profilers (e.g., profiler 124 and additional profilers not shown in FIG. 1). Illustratively, storage of a number of profilers on a client computing device 120 may reduce the need to transfer profilers between the performance information collection system 100 and the client computing devices 120. In some embodiments, the target program may be associated with an operator of the performance information collection system. In some such embodiments, the performance monitoring agent or one or more profilers may be transmitted to the client computing device 120 along with the target program.

As previously described, the performance monitoring agent 122 may cause the execution of a profiler, such as profiler 124, in conjunction with one or more target programs executing on a client computing device. A target program may correspond to any program executing on a client computing device for which performance information is desired. For example, a target program may be a program executed by an operating system of a client computing device. As a further example, a target program may correspond to a program executed within a distinct program on a client computing device. Illustratively, a target program may be a script executed within a web browser on a client computing device.

In some embodiments, a target program may be modified to include all or a portion of the profiler 124. For example, computer code corresponding to the profiler 124 may be included at points within a target program. Such computer code may comprise the entirety of a profiler 124, or may comprise portions of a profiler 124 (e.g., function calls or references to the profiler 124). In other embodiments, a profiler 124 may be configured to run without requiring modification of the code of a target program.

The profiler 124 may be executed in conjunction with a target program, and collect performance information corresponding to the target program. As described above, such performance information may correspond to various performance metrics. Examples of performance metrics include, but are not limited to, occurrences of specified failures (e.g., crashes, errors, etc.), use of computing resources (e.g., CPU, RAM, or HDD use), frequency or amount of use of specific computing instructions, frequency or duration of function calls, amount or frequency of lost information (e.g., transmission failures or memory faults), and latency of a program or operations. Further, profiler 124 may report the collected performance information to the performance information collection system 100. In some embodiments, profiler 124 may report the collected performance information to performance monitoring agent 122, which in turn may report collected performance information to the performance information collection system 100.

In the illustrative embodiment, the performance information collection system 100 includes a performance monitoring module 102, a performance analysis module 104, and a performance information data-store 106. Though shown separately for the purposes of this disclosure, in some embodiments, each of the performance monitoring module 102, the performance analysis module 104, and the performance information data-store 106 may be combined with one or more other modules without affecting the functionality of the performance information collection system 100. Further, the performance information collection system 100 may include additional modules or components not shown in FIG. 1 while remaining within the scope of this disclosure.

In some embodiments, the performance information collection system 100 may be implemented by a single computing device. In other embodiments, the performance information collection system 100 may be implemented by a number of computing devices in communication with one another. In some embodiments, the computing device or devices may correspond to physical computing devices. In other embodiments, the computing devices or devices may correspond to virtual machine instances implemented by one or more physical computing devices. In still other embodiments, computing devices may correspond to both virtual computing devices and physical computing devices.

Further, each of the performance monitoring module 102, the performance analysis module 104, and the performance information data-store 106 may be embodied in one or more virtual or physical computing devices. In some embodiments, each of the performance monitoring module 102, the performance analysis module 104, and the performance information data-store 106 may be embodied by separate computing devices. In other embodiments, two or more of the performance monitoring module 102, the performance analysis module 104, and the performance information data-store 106 may be embodied at least in part by the same computing device.

Illustratively, the performance monitoring module 102 may receive performance information for each client computing device 120, and store the received performance information in the performance information data-store 106. The performance information data-store 106 may correspond to any persistent memory capable of holding received performance information, including but not limited to a hard disk drive (HDD) and a network attached storage device (NAS). In some embodiments, the performance information data-store 106 may include a relational database. Further, the performance monitoring module 102 may also be configured to transmit commands to one or more client computing devices 120 causing the implementation or execution of one or more profilers. As will be described in more detail below, in some embodiments, the performance monitoring module 102 may be configured to determine which client computing devices 120 should be sent commands to implement profilers, as well as to determine whether to cause the execution of profilers.

In the illustrative embodiment of FIG. 1, the performance analysis module 104 may retrieve performance information stored in the performance information data-store 106, and inspect the retrieved performance information to determine anomalous performance by a client computing device 120. For example, as will be described in more detail below, the performance information may indicate that a specific client computing device 120 or collection of client computing devices 120 are experiencing below average performance with respect to a target program. Performance may be gauged by reference to one or more of the collected performance metrics related to the target program. In some embodiments, anomalous performance may be associated with a threshold value relative to performance of other client computing devices 120. For example, anomalous performance information may correspond to client computing devices 120 whose performance metrics are more than five standard deviations above the mean performance value of all client computing devices 120. As a further example, anomalous performance information may correspond to a certain percentile of clients (e.g., the bottom performing 1% of clients).

The performance analysis module 104 of FIG. 1 may, based on the detection of anomalous performance by a client computing device 120, instruct the performance monitoring module 102 to collect additional performance information regarding the anomalous client computing device 120 or other client computing devices 120. The performance monitoring module 102 may then instruct one or more client computing devices 120 to implement an alternative or additional profiler (not shown in FIG. 1). Such an additional or alternative profiler may, for example, be associated with more aggressive collection of performance information. As will be described in more detail below, the performance monitoring module 102 may further be configured to determine alternative actions to execute in response to a request from the performance analysis module 104. For example, the performance monitoring module 102 may disregard requests from a performance analysis module 104 until a certain number of requests have been received, or may select alternative or additional client computing devices 120 on which to execute an additional or alternative profiler.

Though generally described herein with respect to additional or alternative profilers, in some embodiments, a single profiler may be modified to monitor the performance of a target program in a different way. For example, profiler 124 may be configured to receive information from the performance information collection system 100 corresponding to a number of performance metrics to be monitored and the rate of such monitoring. As such, profiler 124 may alter its monitoring of a target program according to the instructions of the performance information collection system 100. As such, though described herein with respect to multiple profilers, any of the systems and methods herein may be utilized in conjunction with a single profiler 124.

Figure 2A:
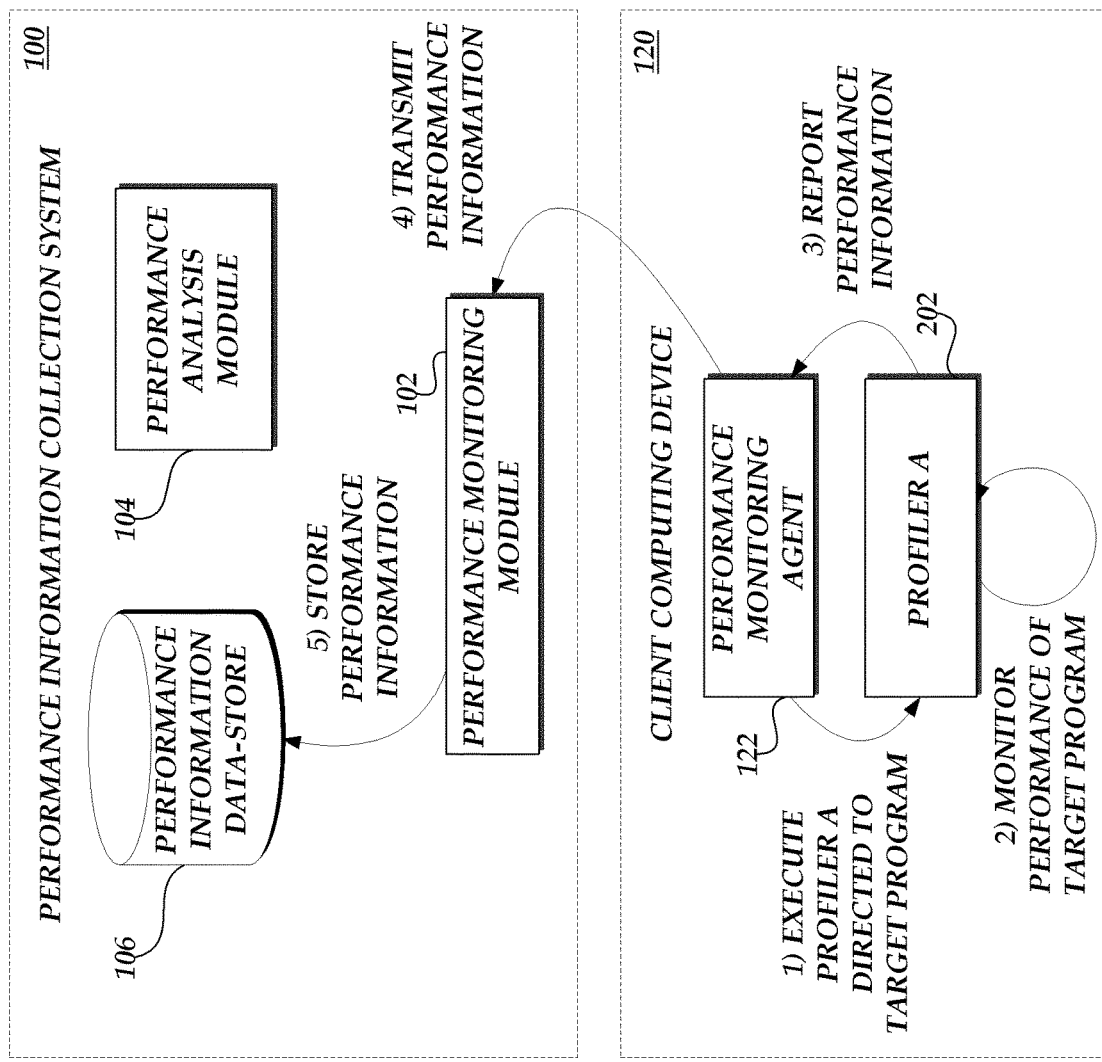
FIG. 2A is a simplified block diagram of the performance information collection system and a client computing device of FIG. 1 illustrating the instantiation of a first profiler and collection of performance information of a computer program executing on a client computing device.
Figure 2B:
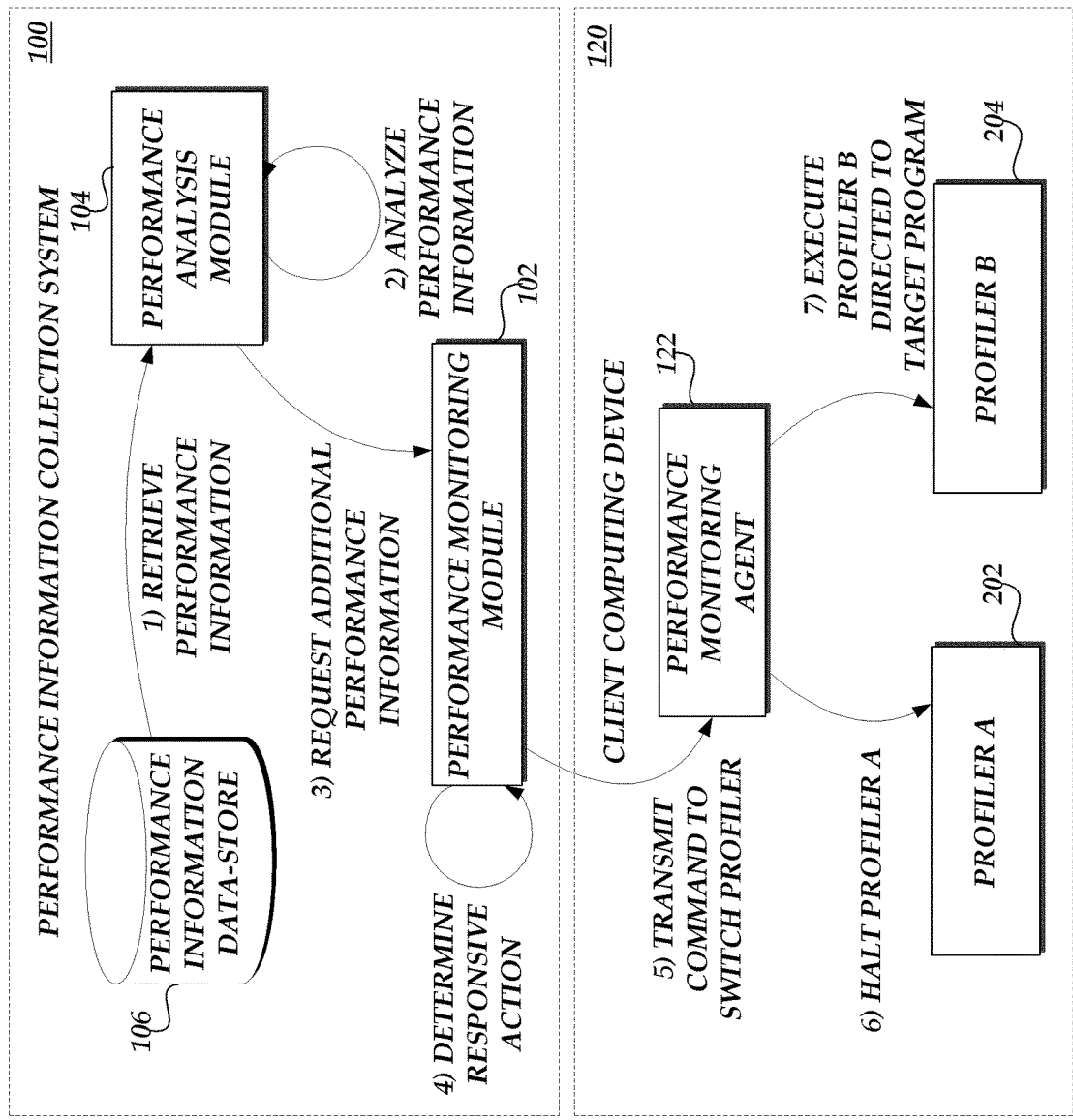
FIG. 2B is a simplified block diagram of the performance information collection system and a client computing device of FIG. 1 illustrating the analysis of collected performance information and instantiation of a second profiler on a client computing device.
Figure 2C:
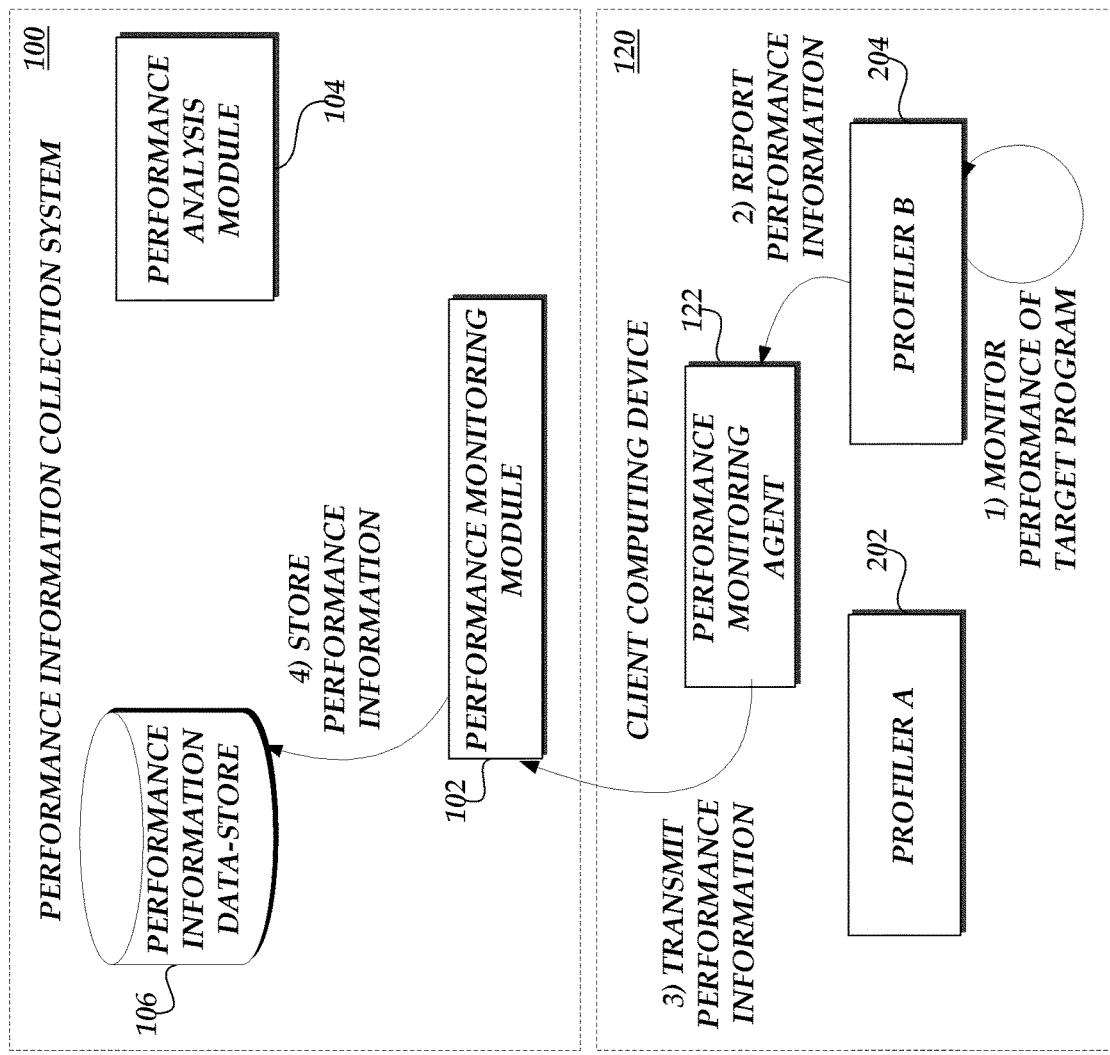
FIG. 2C is a simplified block diagram of the performance information collection system and a client computing device of FIG. 1 illustrating the collection of performance information of a computer program executing on a client computing device according to the second profiler.

With reference to FIGS. 2A-C, simplified block diagrams are shown illustrating the collection of performance information according to a number of profilers. Specifically, FIG. 2A is a simplified block diagram illustrating the collection of performance information of a target program according to a profiler A 202. FIG. 2B is a simplified block diagram illustrating the analysis of performance information from a performance information data-store, such as performance information data-store 106 of FIG. 1, as well as the transmission of a command to execute profiler B 204 on the client computing device 120. FIG. 2C is a simplified block diagram illustrating the collection of performance information of a target program according to a profiler B 204.

As shown in FIG. 2A at (1), a performance monitoring agent 122 may execute a profiler A 202 directed to monitoring a target program executing on a client computing device 120. Profiler A 202 may correspond to a profiler 124 as described above with respect to FIG. 1. Specifically, in this illustrative example, profiler A 202 may correspond to a profiler configured to monitor performance of a target program at a relatively low rate, such that the impact on the target program or on the client computing device 120 may be low or negligible. The performance monitoring agent 122 and the profiler A 202 may have been previously received by the client computing device 120 from the performance information collection system 100 or another associated system. In some embodiments, the profiler A 202 may have been received in conjunction with a command from the performance information collection system 100 to begin performance monitoring of the target program. Further, in some embodiments, the target program may be transmitted to the client computing device 120 by the performance information collection system 100 or another associated system. In these embodiments, either or both of the performance monitoring agent 122 and the profiler A 202 may have been transmitted to the client computing device 120 in conjunction with the target program.

With continued reference to FIG. 2A at (1), execution of the profiler A 202 may, in some embodiments, require modification of computer code corresponding to the target program. For instance, all or a portion of code corresponding to the profiler A 202 may be inserted into the target program. As a further example, the target program may be modified at a number of locations to insert references to the profiler A 202 (e.g., function calls to the profiler A 202). In some embodiments, the performance monitoring agent 122 may be configured to make such modifications while having little or no impact on the execution of the target program. For example, in embodiments where the target program corresponds to a program implemented in JavaScript, the performance monitoring agent 122 may modify the corresponding computer code of the target program during execution. In other embodiments, the performance monitoring agent 122 may halt or pause the execution of a target program (if it is running) in order to facilitate execution of the profiler A 202. In still more embodiments, the profiler A 202 may be configured to monitor the performance of a target program without modification of the target program. For example, the profiler A 202 may monitor performance metrics of the host of the target program. Illustratively, a host may correspond to an operating system of the client computing device 120, or to another program executing on the client computing device 120, such as a web browser.

As described above, at (2), the profiler A 202 may monitor the target program with respect to a variety of performance metrics. These performance metrics may correspond to, by way of non-limiting example, occurrences of specified failures (e.g., crashes, errors, etc.), use of computing resources (e.g., CPU, RAM, or HDD use), frequency or amount of use of specific computing instructions, frequency or duration of function calls, amount or frequency of lost information (e.g., transmission failures or memory faults), and latency of a program or operations. Any one or more performance metrics may be monitored at different rates, based on the frequency of performance information desired. For example, higher rates of monitoring may require more computing resources of the client computing device 120, resulting in a degradation of the experience of the client. Further, higher rates of monitoring may otherwise slow the operation of the target program. As such, and as described above, profiler A 202 may be configured to sample a collection of performance metrics at a relatively low rate, such that the impact on the performance of the target program and the client computing device 120 is low or negligible. This may enable profiler A 202 to operate during all or the majority of times in which the target program is executing.

After collection of performance information corresponding to monitored performance metrics of the target program, at (3), the profiler A 202 may report the collected performance information to the performance monitoring agent 122. Similarly, at (4), the performance monitoring agent 122 may transmit the collected performance information to the performance monitoring module 102 of the performance information collection system 100. In some embodiments, profiler A 202 may, at the completion of execution of a target program, transmit the entirety of the collected performance data to the performance monitoring agent 122. The performance monitoring agent 122 may, in turn, transmit such collected performance data to the performance monitoring module 102 of the performance information collection system 100. In other embodiments, either or both of the profiler A 202 and the performance monitoring agent 122 may transmit performance information at multiple times. By way of non-limiting example, either or both of the profiler A 202 and the performance monitoring agent 122 may transmit performance information at a given interval (e.g., every X seconds); when performance information reaches a given size (e.g., every X kilobytes); at specific points during execution of a target program (e.g., every instance of function call X or at X percentage of completion of the target program); or continuously.

Subsequent to receiving performance information, at (5), the performance monitoring module 102 may store the received performance information in the performance information data-store 106 of the performance information collection system 100. In some embodiments, the performance monitoring module 102 may supplement the received performance information with additional information, such as the time that the performance information was received or an identifier of the client computing device 120 from which the performance information was received. In other embodiments, this or similar information may have been included in the performance information by the profiler A 202 or by the performance monitoring agent 122.

Though not shown in FIG. 2A, the performance monitoring module 102 may subsequently modify or process performance information stored in the performance information data-store 106. For example, in some embodiments, the performance monitoring module 102 may purge performance information from the performance information data-store 106 according to given purging criteria. Such purging criteria may correspond, by way of non-limiting example, to an expiry time associated with received performance information (e.g., 10 days after the performance information is received) or to the identity of the client computing device 120 which corresponds to the performance information (e.g., after a client computing device 120 requests corresponding performance information be purged, or at every disconnect or shutdown of the client computing device 120).

With reference to FIG. 2B, a simplified block diagram is shown illustrating the analysis of performance information from a performance information data-store, such as performance information data-store 106 of FIG. 1, as well as the transmission of a command to execute profiler B 204 on the client computing device 120. As will be described in more detail below, profiler B 204 may correspond to a profiler configured to monitor execution of a target program at a higher rate than profiler A 202.

As shown in FIG. 2B, at (1), a performance analysis module 104 may retrieve performance information from the performance information data-store 106. This performance information may correspond to the performance information received from the client computing device 120 of FIG. 2A. In addition, in this illustrative embodiment, the performance information data-store 106 contains performance information corresponding to a number of additional client computing devices 120. Though depicted in FIG. 2B as a discrete action, the performance analysis module 104 may be configured to retrieve performance information from the performance information data-store 106 with a variety of timings. For example, the performance analysis module 104 may be configured to retrieve performance information from the performance information data-store 106 periodically (e.g., at every X seconds), at a specified amount of data contained within or received by the performance information data-store 106 (e.g., every X kilobytes), on storage of new performance information, or continuously. Still further, in some embodiments, the performance information data-store 106 may be omitted, and the performance analysis module 104 may receive performance information directly from the performance monitoring module 102.

With continued reference to FIG. 2B, at (2), the performance analysis module 104 may analyze retrieved performance information to determine one or more client computing devices 120 reporting anomalous performance information or performance information that is otherwise of interest. Anomalous performance information may correspond, for example, to reported performance metrics that fall outside of a certain specified range. For example, client computing devices 120 may be identified which perform in the bottom X percentile of all reporting computing devices. As a further example, client computing devices 120 may be identified which perform outside of X number of standard deviations of a mean client computing device 120 performance level. In some embodiments, any or all performance metrics may be monitored with respect to all client computing devices. In other embodiments, any or all performance metrics may be monitored with respect to similar computing devices, such as computing devices which share hardware, software, or location characteristics. Detection of anomalous performance information may be used to dynamically alter execution of profilers on a client computing device 120. For example, detection of anomalous performance information may trigger the dynamic execution of an updated profiler on the client computing device 120 in order to collect additional performance information.

Though generally described herein with reference to low performance levels, in some embodiments, high performing client computing devices 120 may also be identified. These client computing devices 120 may be of interest, for example, to determine the causes of the reported high performance for possible integration into a target program, or to modify guidelines for computing systems which execute the target program (e.g., system requirements documentation).

In some embodiments, medium performing client computing devices 120 may also be identified. Further, the performance analysis module 104 may detect any of the above performance levels with respect to all performance metrics, or with respect to any combination of performance metrics. For example, the performance analysis module 104 may inspect retrieved performance information with respect to only a single performance metric. In some embodiments, each performance metric may be individually analyzed to determine anomalous performance with respect to each performance metric.

Still further, in some embodiments, criteria for performance information may be specified by an operator of the performance information collection system 100. For example, an operator of the performance information collection system 100 may specify that a set of performance metrics should fall within a set of specified parameters. The performance analysis module 104 may then determine any or all client computing devices 120 which fall within the specified criteria. Operator specified criteria may be used, for example, to identify client computing devices 120 experiencing a target program failure with known symptoms (e.g., performance metrics within a specified range).

Thereafter, at (3), the performance analysis module 104 may request additional performance information from the performance monitoring module 102. In some embodiments, a request for additional performance information may correspond to a request to instantiate a more aggressive profiler on a client computing device 120. For example, where a client computing device 120 is currently executing profiler A 202, a request for additional information may correspond to a request to execute profiler B 204. In addition, additional performance information may be collected from the same client computing device 120 associated with the anomalous performance information. In some embodiments, as will be described in more detail below with respect to FIG. 3, additional performance information may be requested from a client computing device 120 similar to the client computing device 120 identified within the anomalous performance information.

In response, at (4), the performance monitoring module 102 may determine an action to take in response to the received request. In some embodiments, a responsive action may include transmitting a command to a client computing device 120 to enable, disable, or switch a profiler. For example, a responsive action may include halting a first profiler on a client computing device 120, and executing a second profiler. Illustratively, the second profiler may be associated with alternative or additional performance metrics, or with a different rate of monitoring than the first profiler. In addition, a responsive action may include determining client computing devices 120 to which to transmit commands. For example, the request from the performance analysis module 104 may correspond to a request to collect additional performance information corresponding to a specified client computing device 120. However, in some situations, that specified client computing device 120 may not be available (e.g., the device has disconnected from the network 110, shut down, or requested removal of the performance monitoring agent 122). As such, the performance monitoring module 102 may determine another client computing device 120 from which to collect performance information. Illustratively, this alternative client computing device 120 may be similar to the unavailable client computing device 120. In some embodiments, the performance monitoring module 102 may determine that no responsive action should be taken. For example, a threshold number of requests may be set, such that no responsive action is taken until that threshold number of requests is received with respect to an individual client computing device 120. In other embodiments, a threshold number of requests may be set with respect to a given performance metric or set of performance metrics or with respect to a class or configuration of a client computing device 120.

In the illustrative embodiment depicted in FIG. 2B, the performance information module may determine that, in response to the request for additional information, a command should be sent to client computing device 120 to switch from a first profiler A 202 to a second profiler B 204 associated with an increased rate monitoring of performance metrics, or associated with monitoring of different performance metrics. Illustratively, the client computing device 120 may correspond to the client computing device associated with detected anomalous performance information.

As such, at (5) a command to switch from profiler A 202 to profiler B 204 may be transmitted from the performance monitoring module 102 to the performance monitoring agent 122 executing on the client computing device 120. In some embodiments, such a command may be transmitted in conjunction with transmittal of profiler B 204 to the client computing device 120. In other embodiments, the client computing device 120 may have previously received the profiler B 204 from the performance information collection system 100 or from another source.

On receiving such a command, the performance monitoring agent 122 may, at (6), halt execution of profiler A 202 (if such a profiler is currently executing), and, at (7) execute profiler B 204 directed to the target program. As described above, in some embodiments, execution of a profiler may include modifying computer code associated with a target program. Similarly, halting execution of a profiler may include modifying code associated with the target program. As such, either or both (6) or (7) may involve modifying computer code of the target program executing on the client computing device 120.

With reference now to FIG. 2C, a simplified block diagram is shown illustrating the collection of performance information of a target program according to a profiler B 204. Similarly to FIG. 2A, a profiler B 204 may, at (1), monitor performance of a target program in order to generate performance information. The profiler B 204 may monitor the target program with respect to a variety of performance metrics, including occurrences of specified failures (e.g., crashes, errors, etc.), use of computing resources (e.g., CPU, RAM, or HDD use), frequency or amount of use of specific computing instructions, frequency or duration of function calls, amount or frequency of lost information (e.g., transmission failures or memory faults), and latency of a program or operations. In this illustrative example, profiler B 204 may be configured to sample a collection of performance metrics at a relatively high rate when compared to profiler A 202. As such, profiler B 204 may generate more detailed performance information than profiler A 202, in order to satisfy a request for information from the performance analysis module 104. Due to a higher rate of performance monitoring, profiler B 204 may be associated with a higher consumption of computing resources, and the client of the client computing device 120 may be warned that enabling profiler B 204 may have an impact on the execution of the target program. However, the increased performance information gathered by profiler B 204 may enable an operator of the performance information collection system 100 to correct a fault or failure in the target program which previously led to poor performance on the client computing device 120.

After collection of performance information corresponding to monitored performance metrics of the target program, at (2), the profiler B 204 may report the collected performance information to the performance monitoring agent 122. Similarly, at (3), the performance monitoring agent 122 may transmit the collected performance information to the performance monitoring module 102 of the performance information collection system 100. As described above with respect to profiler A 202 of FIG. 2A, in some embodiments, each of (2) and (3) may occur at a single instance. For example, profiler B 204 may, at the completion of execution of a target program, transmit the entirety of the collected performance data to the performance monitoring agent 122. The performance monitoring agent 122 may, in turn, transmit such collected performance data to the performance monitoring module 102 of the performance information collection system 100. In other embodiments, either or both of the profiler B 204 and the performance monitoring agent 122 may transmit performance information at multiple times. By way of non-limiting example, either or both of the profiler B 204 and the performance monitoring agent 122 may transmit performance information at a given interval (e.g., every X seconds); when performance information reaches a given size (e.g., every X kilobytes); at specific points during execution of a target program (e.g., every instance of function call X or at X percentage of completion of the target program); or continuously.

Subsequent to receiving performance information, the performance monitoring module 102 may, at (4), store the received performance information in the performance information data-store 106 of the performance information collection system 100. In some embodiments, the performance monitoring module 102 may supplement the received performance information with additional information, such as the time that the performance information was received or an identifier of the client computing device 120 from which the performance information was received. In other embodiments, this or similar information may have been included in the performance information by the profiler B 204 or by the performance monitoring agent 122.

Though not depicted in FIG. 2C, subsequent to storage of the received performance information, an operator of the performance information collection system 100 may be notified of the received performance information. In some embodiments, an operator may be notified after a threshold number of profilers B 204 executing on client computing devices 120 have reported performance information. The operator of the performance information collection system 100 may then inspect the target program in view of the more detailed performance information generated by profiler B 204.

As discussed above, in some embodiments of the current disclosure, multiple profilers may be utilized, each configured to monitor a variety of performance metrics or rates of performance metrics. As such, though the illustrative diagrams of FIGS. 2A-C depict a first profiler A 202 and a second profiler B 204, any number of profilers may be provisioned to a client computing device 120. For example, a number of profilers may be transmitted to a client computing device 120, where each successive profiler is associated with a more aggressive monitoring of performance information. As such, the level of performance information gathered may be progressively increased based on the state of the client computing device 120 or on the level of information required by the performance information collection system 100. In some embodiments, execution of a profiler may be limited to specified durations. For example, a highly aggressive profiler (corresponding to a large impact on the operation of a target program) may be limited to a relatively small duration of execution. Such a limit may ensure that the operation of the target program is not impacted for an extended duration. In some embodiments, expiration of such a limit may cause the halting of the currently running profiler. Further, expiration of such a limit may cause the execution of a different profiler associated with a lower impact on the target program or the client computing device 120.

In addition, as described above, in some embodiments, a single profiler may be reconfigured in order to alter monitored performance metrics or the rate of monitoring of various performance metrics. As such, in some embodiments, profiler A 202 and profiler B 204 may represent the same profiler utilizing different configurations. Illustratively, a profiler B 204 may be created by updating or modifying profiler A 202 via information transmitted from the performance information collection system 100 (e.g., an update, a patch, or a updated configuration file).

Still further, though the illustrative interactions of FIGS. 2A-C are described herein with respect to detection of anomalous performance information, in some embodiments, a second profiler may be executed in response to a client request. For example, a user of a client computing device 120 may determine that performance information is anomalous or below expectations, and may transmit a request to the performance information collection system 100 to collect additional performance information in order to correct the anomalous condition. Illustratively, a user of a web page executing a target program may specifically request that the operator of the web page correct a perceived anomalous condition. In response, the operator of the web page (corresponding to the operator of the performance information collection system 100) may instruct the client computing device 120 to execute profiler B 204. Thereafter, the illustrative interactions of FIGS. 2A-C may continue at (7) of FIG. 2B. In other embodiments, client requests for additional collection of performance information may trigger the above described interactions. For example, a client request for correction of perceived anomalous performance may trigger the illustrative interactions of any or all of FIGS. 2A-C with respect to the corresponding client computing device 120.

Figure 3:
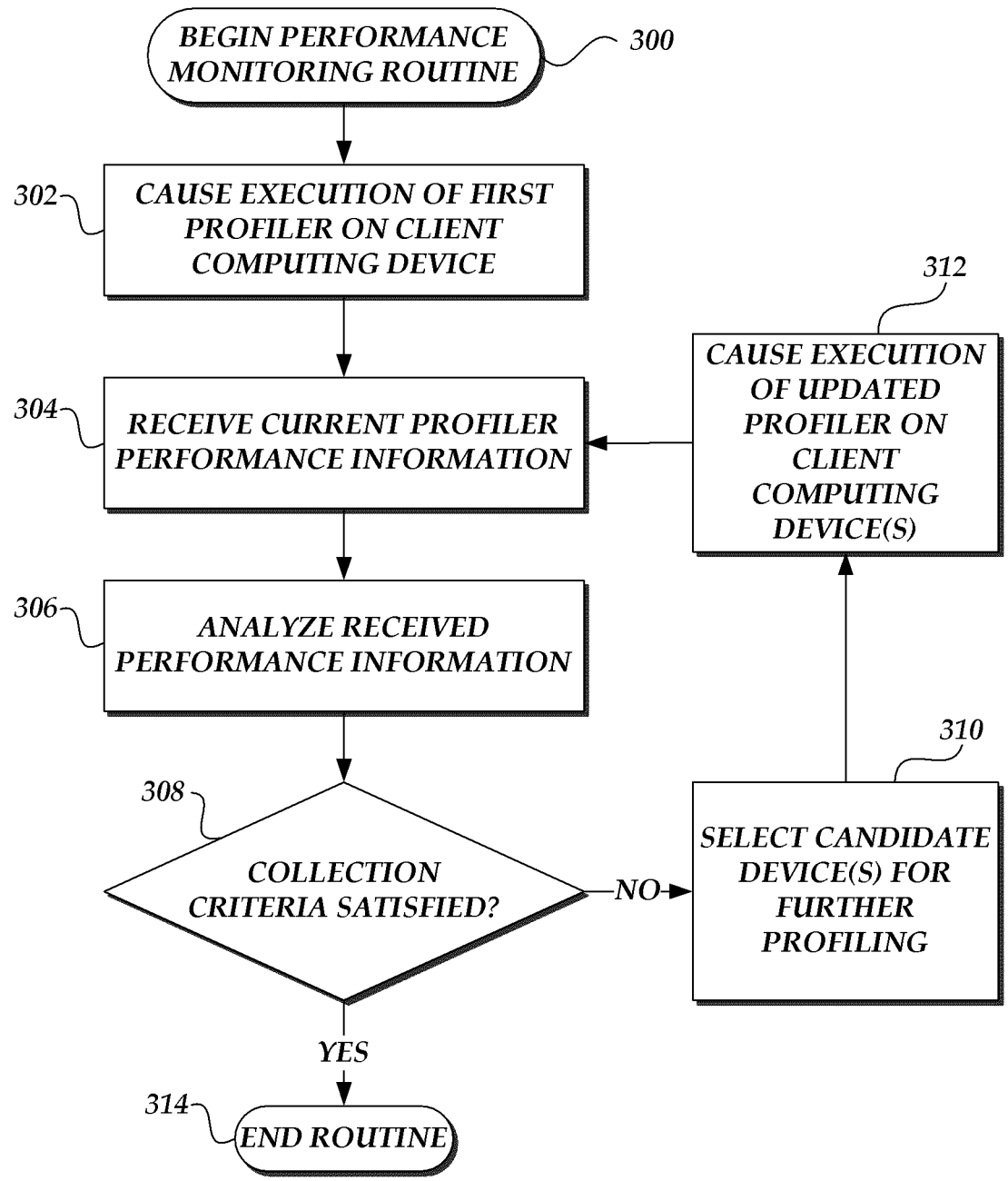
FIG. 3 is a flow diagram depicting an illustrative routine for monitoring the performance of a computer program executing on a client computing device, such as a client computing device of FIG. 1.

With reference to FIG. 3, a flow diagram is shown depicting an illustrative routine 300 for dynamically monitoring the performance of a computer program executing on a client computing device, such as a client computing device 120 of FIG. 1. Such a routine may be carried out, for example, by the performance information collection system 100 of FIG. 1. As described above, a performance information collection system 100, such as is depicted in FIG. 1, may be associated with any number of profilers, wherein each profiler is configured to monitor a successively higher amount of performance information. As such, the illustrative routine 300 of FIG. 3 depicts a routine enabling the collection of performance information from any number of profilers.

At block 302, the performance information collection system 100 may cause the execution of a first profiler, such as profiler A 202 of FIG. 2A, on a client computing device 120. Block 302 may be carried out, for example, by a performance monitoring module 102. Illustratively, causing such an execution may correspond to transmitting a performance monitoring agent 122 and the profiler A 202 to a client computing device 120. In other instances, the client computing device 120 may already include the performance monitoring agent 122. In these instances, the performance information collection system 100 might only transmit the profiler A 202. In still more instances, the client computing device 120 may already include both the performance monitoring agent 122 and the profiler A 202. As such, the performance information collection system 100 may need only to transmit a command to the performance monitoring agent 122 to execute the profiler A with respect to a target program.

At block 304, performance information corresponding to a currently executing profiler may be received from one or more client computing devices 120. Block 304 may be carried out, for example, by a performance monitoring module 102. In the currently described illustration, the current profiler may correspond to profiler A 202 of FIG. 2A, as described above. Accordingly, the performance information may include relatively little detail with regard to the performance of a client computing device 120.

At block 306, the received performance information may be analyzed by the performance information collection system 100 (e.g., by the performance analysis module 104). As described above with respect to FIG. 2B, analysis of performance information may correspond to the detection of anomalous information, which may further correspond to client computing devices 120 which are performing outside of specified performance ranges. For example, analysis may include detection of performance information which is in the bottom X percentile of all information received, outside of an average performance by a threshold amount (e.g., X number of standard deviations), outside of an expected performance or performance range (e.g., operating X seconds slower or using X amount more memory than expected). In some embodiments, any or all of these performance metrics may be anomalous with respect to all client computing devices. In other embodiments, any or all of these performance metrics may be anomalous with respect to similar computing devices, such as computing devices which share hardware, software, or location characteristics.

At block 308, the performance information collection system 100 (e.g., the performance analysis module 104) may determine whether performance information collection criteria has been satisfied with respect to the received performance information. Illustratively, collection criteria may specify the level or type of performance information which should be collected based on previously detected anomalous performance information. For example, collection criteria may specify that, given a specified anomalous performance, additional performance information should be gathered via one or more specified profilers. As a further example, collection criteria may specify that after detection of anomalous performance, additional performance information should be collected over a specified period of time. Still further, collection criteria may specify that, given a specified anomalous performance one or more specified profilers should be engaged to collect performance information. In some embodiments, satisfaction of collection criteria may be based on the currently collected performance information. For example, in some instances, similar anomalous performance information may have been received by a large number of client computing devices 120. However, the performance information may contain sufficient information to determine the cause of the anomaly. As such, no additional performance information may be required in order to satisfy a collection criterion, and the routine 300 may end at block 314. In some embodiments, an operator of the performance information collection system 100 may indicate whether the collection criteria have been satisfied. In still more embodiments, aspects of the anomalous performance information may be used to determine whether collection criteria have been satisfied. Illustratively, where performance information has been gathered from a relatively large number of client computing devices 120, it may be likely that the already gathered performance information will be sufficient to diagnose the anomalous performance. Conversely, where a relatively small number of client computing devices 120 have transmitted anomalous performance information, additional performance information may be required.

As a further example, gathering of performance information may be at least somewhat governed by the resources available to the performance information collection system 100. As such, a determination of whether collection criteria have been satisfied may be dependent on how widespread or serious anomalous performance information is determined to be. For example, where anomalous performance is received from one or a small number of client computing devices 120, or where anomalous performance information is not repeatedly received from a client computing device 120, the performance information collection system 100 may determine that no further performance information is immediately required. As such, the routine may then end at block 314.

If it is determined that a collection criterion is not satisfied, the routine 300 may then proceed to block 310, where at least one candidate client computing device 120 may be selected for further collection of performance information via one or more profilers. Illustratively, a candidate client computing device 120 may correspond to a client computing device 120 associated with previously received anomalous performance information. In some embodiments, a candidate client computing device 120 may correspond to a client computing device 120 similar to the client computing device 120 associated with previously received anomalous performance information. By selecting candidate client computing devices 120 similar or the same as those that previously reported anomalous performance information, the performance information collection system 100 may ensure that any newly received performance information closely correlates to the previously received anomalous performance information.

Client computing devices 120 may be described as similar for the purposes of the present disclosure under a variety of circumstances. For example, client computing devices 120 may be described as similar if the report similar performance information according to one or more performance metrics. As a further example, client computing devices 120 may be described as similar if they share one or more similar hardware or software characteristics. These characteristics may include, but are not limited to, type or amount of hardware included within a client computing device 120 (e.g., central processing unit CPU, persistent or non-persistent memory or storage, and network interface or access, etc.), or type of software included within a client computing device (e.g., version of a target program or another program, inclusion or exclusion of a program, etc.). Still further, client computing devices 120 may be described as similar if they share other characteristics, such as a physical location.

With continued reference to block 310, candidate client computing devices 120 may further be determined based on the amount of additional performance information required. For example, where a small amount of additional performance information is required, a smaller number of client computing devices 120 may be selected as candidate client computing devices 120. Conversely, if a large amount of performance information is required, a larger number of client computing devices 120 may be selected.

Subsequent to selection of at least one candidate client computing device 120, the performance information collection system 100 may cause, at block 312, the execution of an updated profiler on the candidate client computing devices 120. As described above, causing execution of an update profiler may include transmitting the updated profiler to the candidate client computing device 120, or may include transmitting a command to execute the updated profiler to the candidate client computing device 120. In some embodiments, the routine may further include selection of an updated profiler (not shown). For example, where multiple profilers are provided, a profiler may be selected according to the amount or detail of the performance information which is required. Illustratively, a number of profilers may be provided, each successive profiler being associated with an increased collection of performance information. As such, the performance information collection system 100 may select one of the number of profilers according to the level of performance information required. In some embodiments, the performance information collection system 100 may automatically select the profiler which immediately succeeds the current profiler in such a number of profilers. For example, if profiler A 202 is currently collecting performance information of a client computing device 120, the performance information collection system may be configured to cause the execution of profiler B 204. Similarly, if profiler B 204 is currently collecting performance information of a client computing device 120, the performance information collection system may be configured to cause the execution of profiler C (not shown), etc.

As described above, in some embodiments, a set of profilers may include a hierarchy of profilers divided into multiple branches. For example, each branch within such a hierarchy may correspond to a set of profilers directed to monitoring a specified set of performance metrics. Illustratively, the first profiler previously executed via the routine 300 may correspond to a root profiler of the hierarchy. As such, an updated profiler may be selected based on the established hierarchy and the detected performance information anomaly. Illustratively, if the detected anomaly corresponds to a specific type of program crash, a branch of the hierarchy may be selected which relates to that specific program crash, and the next profiler in that branch may be selected. Similarly, in some embodiments, non-hierarchical profiler maps may be created illustrating the profiler which should be selected based on the currently executing profiler and the detected anomalous performance information.

After the execution of an updated profiler is caused, the routine 300 may continue at block 304 as described above. However, the current profiler would then correspond to the profiler previously executed at block 312. The routine 300 may continue as described above, and ever more aggressive profilers may be executed, until sufficient performance information is deemed to have been received at block 308. At such a point, the routine 300 may end at block 314.

Though not shown in FIG. 3, in some embodiments, satisfaction of collection criteria may cause the halting of a currently executing profiler, and instantiation of a profiler associated with a lower impact on the operation of a client computing device 120. For example, where a profiler with a very high rate of performance monitoring was executed on a client computing device 120 in order to increase the detail of information gathered, the routine 300 may include an operation to halt execution of that profiler before completion. The routine 300 may further include an operation to begin execution of a profiler associated with a low or negligible impact on the operation of the client computing device 120. In some embodiments, such an operation may represent a return to execution of a previously executed profiler.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without client input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
 profiling performance of a web page at a first rate;
 obtaining an indication that the performance of the web page profiled at the first rate is anomalous; and
 profiling performance of the web page at a second rate in response to obtaining the indication, wherein the second rate is greater than the first rate;
 wherein the method is implemented by a computing device rendering the web page, wherein profiling performance of the web page at the first rate comprises executing at least one profiler implemented by an executable script included in the web page, wherein the first and second rates are rates at which a performance metric is retrieved from the computing device rendering the web page, and wherein the performance metric includes at least an amount of a computing resource of the computing device used to render the web page.

2. The computer-implemented method of claim 1, wherein profiling performance of the web page at the first rate comprises implementing a profiler included within the web page.

3. The computer-implemented method of claim 2, wherein the profiler is included within the web page as client-side scripting.

4. The computer-implemented method of claim 1 further comprising receiving monitoring criteria indicating the second rate.

5. The computer-implemented method of claim 1 further comprising:
 obtaining first output of profiling performance of the web page at the first rate; and obtaining second output of profiling performance of the web page at the second rate;

wherein the second output includes an increased amount of information regarding performance of the web page.

6. The computer-implemented method of claim 5 further comprising analyzing the first output to generate the indication that the performance of the web page profiled at the first rate is anomalous.

7. The computer-implemented method of claim 1, wherein profiling performance of a web page at a first rate comprises profiling performance of client-side scripting included within the web page.

8. A system comprising:

a processor; and a computer memory accessible by the processor and including computer executable instructions that, when executed by the processor, cause the processor to:

profile performance of a web page at a first rate;

obtain an indication that the performance of the web page profiled at the first rate is anomalous; and profile performance of the web page at a second rate in response to obtaining the indication, wherein the second rate is greater than the first rate;

wherein the system corresponds to a computing device on which the web page is rendered, wherein the computer executable instructions are included as an executable script in the web page, wherein the first and second rates are rates at which a performance metric is retrieved from the computing device rendering the web page, and wherein the performance metric includes at least an amount of a computing resource of the computing device used to render the web page.

9. The system of claim 8, wherein the computer executable instructions include a profiler executable to profile performance of the web page at the first rate.

10. The system of claim 9, wherein the computer executable instructions further cause the processor to modify the profiler to profile performance of the web page at the second rate.

11. The system of claim 9, wherein the computer executable instructions further include a second profiler executable to profile performance of the web page at the second rate.

12. The system of claim 8, wherein the computer executable instructions further cause the processor to transmit the first output for analysis, and wherein the indication that the performance of the web page profiled at the first rate is anomalous is an output of the analysis.

13. The computer-implemented method of claim 12, wherein the computer executable instructions further cause the processor to receive monitoring criteria indicating the second rate, and wherein the monitoring criteria are determined based at least in part on the analysis.

14. The system of claim 8, wherein an output of profiling the performance of the web page at the second rate includes an increased amount of information regarding performance of the web page relative to an output of profiling the performance of the web page at the first rate.

15. Non-transitory computer-readable media including computer-executable instructions that, when executed by a computing system, cause the computing system to:

profile performance of a web page at a first rate;

obtain an indication that the performance of the web page profiled at the first rate is anomalous; and profile performance of the web page at a second rate in response to obtaining the indication, wherein the second rate is greater than the first rate;

wherein the computing system corresponds to a computing device on which the web page is rendered, wherein the computer executable instructions are included as an executable script in the web page, wherein the first and second rates are rates at which a performance metric is retrieved from the computing device rendering the web page, and wherein the performance metric includes at least an amount of a computing resource of the computing device used to render the web page.

16. The non-transitory computer-readable media of claim 15, wherein the indication that the performance of the web page profiled at the first rate is anomalous includes instructions to profile performance of the web page at the second rate.

17. The non-transitory computer-readable media of claim 15, wherein the indication that the performance of the web page profiled at the first rate is anomalous corresponds to an indication that the performance of the web page profiled at the first rate is at least one of: within a specified percentile of performance rates of the web page, a threshold amount outside of an average performance rate of the web page, or outside of an expected range of performance rates for the web page.

18. The non-transitory computer-readable media of claim 15, wherein the computer executable instructions further cause the computing system to transmit the first output for analysis, and wherein the indication that the performance of the web page profiled at the first rate is anomalous is an output of the analysis.

19. The non-transitory computer-readable media of claim 15, wherein the computer executable instructions further cause the computing system to receive monitoring criteria indicating the second rate, and wherein the monitoring criteria are determined based at least in part on the analysis.

20. The non-transitory computer-readable media of claim 15, wherein an output of profiling the performance of the web page at the second rate includes an increased amount of information regarding performance of the web page relative to an output of profiling the performance of the web page at the first rate.

* * * * *

UNITED STATES PATENT AND TRADEMARK OFFICE
CERTIFICATE OF CORRECTION

PATENT NO.        : 10,491,650 B1
APPLICATION NO.   : 13/367083
DATED             : November 26, 2019
INVENTOR(S)       : Nicholas Alexander Allen Page 1 of 1

It is certified that error appears in the above-identified patent and that said Letters Patent is hereby corrected as shown below:

On the Title Page

In Column 2, Item (56), Line 5, under U.S. Patent Documents, delete "Ii" and insert --Li--.

In the Claims

In Column 19, Line 49, Claim 13, delete "The computer-implemented method of claim 12," and insert --The system of claim 12,--.

Signed and Sealed this
Seventeenth Day of March, 2020

Andrei Iancu
*Director of the United States Patent and Trademark Office*